United States Patent
Young

[15] 3,669,173
[45] June 13, 1972

[54] PNEUMATIC TIRES

[72] Inventor: Maurice A. Young, Whittington, Lichfield, England

[73] Assignee: Dunlop Holdings Limited, London, England

[22] Filed: Sept. 15, 1969

[21] Appl. No.: 858,159

[30] Foreign Application Priority Data

Sept. 26, 1968 Great Britain.....................45,650/68

[52] U.S. Cl..............................152/361, 152/359, 57/140 G
[51] Int. Cl.........................................................B60c 9/20
[58] Field of Search...................152/356, 359, 361; 57/140, 57/140 G; 161/181

[56] References Cited

UNITED STATES PATENTS

| | | | |
|---|---|---|---|
| 3,311,152 | 3/1967 | Marzocchi et al. | 152/359 |
| 3,395,529 | 8/1968 | Ray | 57/153 |
| 2,224,274 | 12/1940 | Powers | 152/359 |

*Primary Examiner*—Arthur L. La Point
*Assistant Examiner*—Robert Saifer
*Attorney*—Stevens, Davis, Miller & Mosher

[57] ABSTRACT

A breaker layer for a pneumatic tire comprising rubber-impregnated glass cords or yarns of filaments each having a diameter between 0.0005 and 0.0008 inches.

7 Claims, No Drawings

PNEUMATIC TIRES

This invention relates to pneumatic tires and is an improvement thereto.

It is generally realized that greater wear resistance and road holding of a tire may be obtained by increasing the lateral stiffness of the tire tread and in general this has been accomplished by incorporating a breaker belt radially inwardly of the tread portion of the tire. Such an expedient is applicable both to radial ply and cross ply tires. It would follow that breaker layers comprising cords of extremely high modulus would be preferred. However, practice has illustrated that such cords, for example those of steel, suffer from difficulties in processing, and also tires incorporating such cords suffer a high degree of noise transmission. Consequently cords of lower modulus such as, for example, rayon, are commonly employed in breaker belts. Such use, however, necessitates multiplication of the number of breaker layers required in order to achieve the desired lateral stiffness.

Fiber of glass filaments on the other hand offers a compromise in that it is of intermediate modulus. It suffers, however, from the disadvantage of a sensitivity to surface damage. In the dynamic application to which it is subjected when employed in the role of a breaker cord material precautions are normally taken to insulate the individual glass filaments from one another by coating with a suitable material to prevent self-destruction.

In addition, glass fiber filaments of the smallest practical diameter have hitherto been employed to achieve maximum flexibility and cord strength. However, such glass fiber filaments are relatively expensive to produce, their surface area, which may be correlated to surface damage susceptibility, is relatively large, and their sustained resistance to buckling of the cord is inadequate due to limited dynamic endurance.

According to the present invention a breaker layer for a pneumatic tire comprises yarns or cords arranged in side-by-side and substantially parallel relationship and impregnated with rubber or a rubber-like composition, the yarns or cords being made up of glass filaments the individual filaments having a diameter greater than 0.00045 inches.

According to the present invention also a pneumatic tire comprises a carcass and a breaker assembly, the breaker assembly comprising at least one breaker layer as described in the immediately preceding paragraph. Filaments having diameters in the range 0.0005 to 0.0008 inches are preferred, particularly filaments of E-glass (Electrical glass). Silica glass filaments may be used if desired, e.g. silica glass filaments of diameter 0.002 inches.

Filaments of diameter greater than 0.00045 inches enable relatively facile production and impregnation of the yarn or cord. In addition, each filament exhibits a relatively lower surface area per unit weight and is therefore less susceptible to surface damage.

The yarns or cords may be impregnated with a rubber or rubber-like composition before or during twisting thereof.

Preferably the yarns or cords are impregnated with a resorcinol formaldehyde latex composition wherein said composition acts in the capacity of a bonding agent in addition to its role of insulating the individual filaments from one another.

The yarns used in the breaker layer of the invention can simply be multifilament yarns consisting of a plurality of the glass filaments twisted together. Alternatively, cords may be used in the breaker layer, the cords consisting of several such multifilament yarns twisted together. The yarns or cords preferably have a low degree of twist, for example a twist angle of less than 19°.

Using the breaker layers of the invention a breaker assembly can be built up comprising several superimposed individual breaker layers of cord fabric in which cords in adjacent layers are arranged with opposite bias angles. The breaker assembly can have any suitable construction and can, for example, have a cut edge or folded edge construction.

The tire carcass on which the breaker assembly is positioned can have a radial-ply or cross-ply construction and can contain any suitable type of reinforcing cords, for example textile cords e.g. rayon cords or metal cords.

Examples of the invention will now be described in order to illustrate the invention more clearly.

EXAMPLE I

Two 2.5 — 8 radial ply pneumatic tires each having a breaker assembly consisting of two breaker layers were constructed. In both tires the casing was a single ply construction in which the cords were 2/1100 denier rayon cords the cord spacing being 23 ends/inch.

Tire 1 was provided with breaker layers of fiber glass cords comprising E-glass filaments of 0.00038 inches diameter the cord having a denier of 2/1490. The cut bias angle of the two layers was 21°, the bias of one layer being in the opposite sense to that of the other. The cords comprise two turns per inch twist and the cord spacing in the layers was 27.4 ends per inch. This tire was employed in the following test for comparison purposes only.

Tire 2 was provided with two breaker layers of fiber glass cord comprising E-glass filaments of 0.00053 inches diameter the cord having a denier of 3/1210. As in tire 1 the cut bias angle of the two breaker layers was 21°. The cord comprised two turns per inch twist and the cord spacing in the breaker layers was 24.6 ends per inch.

The tires were otherwise identical. The results are illustrated in the following table:

| | | | | | | | |
|---|---|---|---|---|---|---|---|
| Vertical load (lb.) | 106 | 65 | 106 | 156 | 156 | 206 | 206 |
| Inflation pressure (lbs./in.²) | 25 | 10 | 10 | 40 | 25 | 50 | 40 |
| Tire 1 ª | 100 | 122 | 78 | 61 | 61 | 39 | 28 |
| Tire 2 ª | 100 | 128 | 78 | 67 | 61 | 44 | 33 |

ª Relative cornering force component due to breaker

EXAMPLE II

Three 175 — 13 radial ply motor car tires were constructed according to the following specifications. The carcass of each tire was a 2-ply construction in which the cords were 2/1650 denier rayon cords having a spacing of 25 ends/inch.

Tire 3 was provided with a four layer rayon breaker assembly of folded construction comprising cords of 2/2200 denier rayon each filament having a diameter of 0.00047 inches. The breaker assembly consisted of two folded widths of rayon cord fabric each width having a cut bias angle of 21° and a cord spacing of 19 ends/inch.

Tire 4 was provided with a two layer fiber glass breaker assembly comprising 3/2980 denier cords of E-glass filaments each filament having a diameter of 0.00038 inches. The cord spacing in the two layers was 13 ends/inch and the cut bias angle of the layers was 21°.

Tire 5 was provided with a two layer fiber-glass breaker assembly comprising 3/2420 denier cords of E-glass filaments each filament having a diameter of 0.00053 inches. The cord spacing in the two layers was 13 ends/inch and the cut bias angle of the layers was 21°.

Tires 3 and 4 were provided for reference purposes.

The lateral stiffness of the tire treads was measured and the breaker contributions computed.

The results are illustrated in the following table:

| Tires No. | Filament diameter and material | Cord twist turns per inch | No. of cord layers in breaker | Breaker fabric tensile strength (lb./inch) | Relative breaker lateral stiffness |
|---|---|---|---|---|---|
| 3 | .00047″, rayon | 8.5 | 4 | 1,900 | 100 |
| 4 | .00038″, E-glass | 1.5 | 2 | 1,600 | 103 |
| 5 | .00053″, E-glass | 2 | 2 | 1,700 | 114 |

It is apparent from the aforementioned examples therefore that a breaker constructed according to the present invention and incorporated in a pneumatic tire exhibits a higher relative cornering force component and increases the lateral stiffness of the tire tread.

Having now described my invention — what I claim is:

1. A breaker layer for a pneumatic tire which comprises yarns or cords arranged in side-by-side and substantially parallel relationship and impregnated with rubber or a rubber-like composition, the yarns or cords being made up of glass filaments and the individual filaments having a diameter greater than 0.0005 inch and less than 0.0008 inch.

2. A breaker layer according to claim 1 in which the glass filaments are E-glass filaments.

3. A breaker layer according to claim 1 in which the glass filaments are silica-glass filaments.

4. A breaker layer according to claim 1 in which the rubber or rubber-like composition is a resorcinol-formaldehyde-latex composition.

5. A pneumatic tire which comprises a carcass and a breaker assembly the breaker assembly comprising at least one breaker layer as claimed in claim 1.

6. A pneumatic tire according to claim 5 in which the carcass is of radial-ply construction.

7. A pneumatic tire according to claim 5 in which the carcass is of cross-ply construction.

* * * * *